(12) United States Patent
Elliott et al.

(10) Patent No.: US 10,278,119 B2
(45) Date of Patent: *Apr. 30, 2019

(54) RESTORATION OF NETWORK ACCESS

(71) Applicant: BRITISH TELECOMMUNICATIONS PUBLIC LIMITED COMPANY, London (GB)

(72) Inventors: David Mark Elliott, London (GB); Craig David Mulvaney, London (GB); David Andrew Bruce, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 164 days.

This patent is subject to a terminal disclaimer.

(21) Appl. No.: 14/648,442

(22) PCT Filed: Nov. 15, 2013

(86) PCT No.: PCT/GB2013/000491
§ 371 (c)(1),
(2) Date: May 29, 2015

(87) PCT Pub. No.: WO2014/083295
PCT Pub. Date: Jun. 5, 2014

(65) Prior Publication Data
US 2015/0305082 A1 Oct. 22, 2015

(30) Foreign Application Priority Data
Nov. 29, 2012 (EP) .................................... 12250177

(51) Int. Cl.
*H04W 48/16* (2009.01)
*H04W 48/20* (2009.01)
(Continued)

(52) U.S. Cl.
CPC .......... *H04W 48/16* (2013.01); *H04W 24/08* (2013.01); *H04W 48/20* (2013.01); *H04W 76/19* (2018.02); *H04W 88/08* (2013.01); *H04W 92/045* (2013.01)

(58) Field of Classification Search
CPC ... H04W 76/028; H04W 24/08; H04W 48/16; H04W 48/20; H04W 88/08; H04W 92/045
See application file for complete search history.

(56) References Cited

U.S. PATENT DOCUMENTS 6,212,375 B1   4/2001  Alanara
6,999,459 B1   2/2006  Callon
(Continued)

FOREIGN PATENT DOCUMENTS

EP        2 387 266       11/2011
WO    WO 2011/113467      9/2011

OTHER PUBLICATIONS

International Search Report for copending Application No. PCT/GB2013/000492 dated Feb. 11, 2014, 4 pages.
(Continued)

*Primary Examiner* — Ian N Moore
*Assistant Examiner* — Latresa A McCallum
(74) *Attorney, Agent, or Firm* — Nixon & Vanderhye P.C.

(57) ABSTRACT

In the event of loss of connection (4) between an access point (3) and a data network (5), the access point (3) transmits instructions to a data processing device (1) connected to the access point (3) to cause the data processing device (1) to re-establish connection to the data network (5) by another means. These instructions cause the data processing device to scan for beacon signals from further wireless access points, and establish connection (7, 8) to the (Continued)

data network (5) through a wireless access point (6) identified in the scanning process.

8 Claims, 3 Drawing Sheets

(51) Int. Cl.
*H04W 24/08* (2009.01)
*H04W 76/19* (2018.01)
*H04W 92/04* (2009.01)
*H04W 88/08* (2009.01)

(56) References Cited

U.S. PATENT DOCUMENTS

| | | | | |
|---|---|---|---|---|
| 8,913,487 B2* | 12/2014 | Ankaiah | ............... | H04W 24/04 370/221 |
| 2008/0243875 A1* | 10/2008 | Rieman | .................... | G06F 8/60 |
| 2009/0213730 A1 | 8/2009 | Zeng et al. | | |
| 2011/0032816 A1 | 2/2011 | Isaksson et al. | | |
| 2011/0075633 A1 | 3/2011 | Johansson | | |
| 2011/0280118 A1 | 11/2011 | Maharana et al. | | |
| 2012/0002537 A1 | 1/2012 | Bao et al. | | |
| 2012/0224481 A1* | 9/2012 | Babiarz | ............... | H04L 43/0876 370/230.1 |
| 2012/0225655 A1 | 9/2012 | Son et al. | | |
| 2013/0182560 A1* | 7/2013 | Den Hartog | .......... | H04L 12/287 370/225 |

OTHER PUBLICATIONS

International Search Report for PCT/GB2013/000491, dated Jul. 15, 2014, 5 pages.
Elliott, Office Action dated Aug. 2, 2016 issued in corresponding U.S. Appl. No. 14/648,018 (35 pages).
Gandhi "Tolerance to access-point failures in dependable wireless local-area networks", Object-Oriented Real-Time Dependable Systems 2003, Proceedings. Ninth IEEE International Workshop, on Oct. 1-3, 2003, Jan. 1, 2003, pp. 136-143.
Notice of Allowance dated Jul. 27, 2017 issued in co-pending U.S. Appl. No. 14/648,018 (11 pgs).

* cited by examiner

Interface name : Wireless Network Connection
There are 11 networks currently visible.

SSID 1 : BTHomeHub2-4KMN
   Network type     : Infrastructure
   Authentication   : WPA2-Personal
   Encryption       : CCMP
   BSSID 1         : 00:8b:5d:be:5d:3a
     Signal        : 31%
     Radio type    : 802.11n
     Channel      : 6
     Basic rates (Mbps) : 1 2 5.5 11
     Other rates (Mbps) : 6 9 12 18 24 36 48 54

SSID 2 : BTWiFi-with-FON
   Network type     : Infrastructure
   Authentication   : Open
   Encryption       : None
   BSSID 1         : 0a:8b:5d:be:5d:3a
     Signal        : 33%
     Radio type    : 802.11n
     Channel      : 6
     Basic rates (Mbps) : 1 2 5.5 11
     Other rates (Mbps) : 6 9 12 18 24 36 48 54
   BSSID 2         : 02:23:4d:2b:f6:ce
     Signal        : 90%
     Radio type    : 802.11n
     Channel      : 1
     Basic rates (Mbps) : 1 2 5.5 11
     Other rates (Mbps) : 6 9 12 18 24 36 48 54

SSID 3 : BTWiFi
   Network type     : Infrastructure
   Authentication   : Open
   Encryption       : None
   BSSID 1         : 06:8b:5d:be:5d:3a
     Signal        : 33%
     Radio type    : 802.11n
     Channel      : 6
     Basic rates (Mbps) : 1 2 5.5 11
     Other rates (Mbps) : 6 9 12 18 24 36 48 54
   BSSID 2         : 02:23:4d:2b:f6:cd
     Signal        : 91%
     Radio type    : 802.11n
     Channel      : 1
     Basic rates (Mbps) : 1 2 5.5 11
     Other rates (Mbps) : 6 9 12 18 24 36 48 54

SSID 4 : BTHomeHub2-F8PN
   Network type     : Infrastructure
   Authentication   : WPA2-Personal
   Encryption       : CCMP
   BSSID 1         : 00:23:4d:2b:f6:cc
     Signal        : 99%
     Radio type    : 802.11n
     Channel      : 1
     Basic rates (Mbps) : 1 2 5.5 11
     Other rates (Mbps) : 6 9 12 18 24 36 48 54

Figure 5

RESTORATION OF NETWORK ACCESS

This application is the U.S. national phase of International Application No. PCT/GB2013/000491 filed 15 Nov. 2013, which designated the U.S. and claims priority to EP Patent Application No. 12250177.8 filed 29 Nov. 2012, the entire contents of each of which are hereby incorporated by reference.

BACKGROUND AND SUMMARY

This invention relates to connection of data terminals to a data network through wireless access points, and in particular to restoration of such access in the event of failure of a primary connection between an access point and the data network.

Connection to data networks such as the Internet has become an integral part of many domestic and small business activities. Typically, one or more user terminals will connect to the public network through a local area network (LAN) controlled by a router, which mediates data messages between the user terminal and the internet, including providing modem functions. Connection between the terminal and the router may be by an Ethernet or Powerline connection, but increasingly wireless connection is used (a Wireless LAN or WLAN) as this allows terminals to be placed anywhere within wireless range of the router.

Terminals connected to the same router may also communicate between each other without going through the external network. To provide privacy for such activity, and to ensure the router is not misused by unauthorised persons to gain access to the internet, routers typically have access protection to ensure only users with the correct access credentials can use it.

Public wireless access points also exist which allow any users with appropriate terminal equipment to connect to the Internet. These access points may be dedicated public access points provided by commercial enterprises to attract custom, or parts of the capacity of privately-owned access points made available to the public by their owners in exchange for reciprocal access rights to other participants' access points.

Failure of the primary connection between an access point and the network can be problematic as users have become reliant on their internet connections for many business and domestic purposes. In many cases a service provider's helpdesk, or a troubleshooting application, can guide the user to establish a replacement connection to the Internet through a public wireless access point whilst the fault in the primary connection is under repair.

Many troubleshooting operations can be provided by information available on the Internet, but if it is the Internet connection itself which has failed that information is not accessible unless the user has had the foresight to download it in advance. Consequently, such failures account for a very high proportion of calls to network operators' helpdesks— and even that course of action may not be not available if the Internet connection is over the user's telephone line, as the failure is likely to have affected voice calls over the telephone line as well.

The present invention provides a process to allow automatic re-establishment of connection between a user and the data network on detection of failure of the primary network.

It is known, in a related art, to provide for an access point, on detecting a failure of its backhaul (primary) connection, to generate redirection instructions to the wireless terminals currently connected to it. An example of this is described in United States patent application US2011/0032816. However, the system described therein presupposes that the access point has data stored therein relating to the alternative access points to which the terminals should attempt connection. Such an arrangement may be practical in a planned cellular telephone network, where the identities and locations of access points are predetermined by the network operator, and relatively permanent. However, in a network in which access points are under the control of individual users, the availability of such access points is more fluid and unpredictable. Users may move their access points around, or switch them off altogether. In many cases, the access points are provided primarily for the owner's own use, and public access is provided (with suitable firewall protection) only if, and to the extent that, the owner is not using the full capacity. It is therefore not possible, in general, to pre-programme specific redirection instructions in an access point for use in the event of failure of its primary backhaul connection.

A further difficulty with pre-programming data relating to neighbouring access points into the access point itself is that wifi access points have a relatively short range, and a relatively low capacity, primarily intended for individual domestic or business premises. If there is an alternative access point available at all, it is likely that there will in fact be several of them, each with ranges partially overlapping that of the first access point. It is unlikely that any one of them could cope with the extra traffic diverted from the failed access point without a diminishment in service quality to its own customers, or those of the failed access point. It is also likely, as the ranges typically only partially overlap, that the optimum neighbouring access point for reconnection of a data processing device will depend on where that device is located within the area of coverage of the first access point, and indeed the optimum neighbour access point for one terminal may not be the same access point as the optimum for another. According to the present invention, there is provided a process for restoration of network access for a wireless-enabled data processing device initially connected to a data network by means of a first access point after connection between the first access point and the data network is lost, comprising the steps of a) in the first access point, detecting loss of connection to the data network b) transmitting instructions from the first access point to the data processing device to cause the data processing device to
    (i) scan for beacon signals from further wireless access points, and
    (ii) establish connection to a selected one of the further wireless access points
    (iii) establish connection to the data network through the selected further wireless access point This arrangement allows the re-establishment of access to be carried out by the data processing devices themselves. Instead of being given specific redirection routes, they are instead installed with more general programming to allow them each to identify suitable redirection routings for themselves. These devices can therefore each identify the optimum access point to use, taking into account both signal quality and contention from other devices.

It will be noted that the data processing devices can be initially conventional: the search and re-connect functions are installed in the devices by the access point only when and if required. This allows any programmable wireless device that happens to be connected to the access point at the time of the failure of the primary (backhaul) connection to reconnect to another access point.

By having the process initiated by the first access point, in response to detection of a failure in the backhaul connection, re-establishment of connection through an alternative connection is expedited as the data processing devices do not first attempt re-connection through the first access point.

In the preferred embodiment the access point is configured to suspend advertising its presence whilst the backhaul connection is unavailable. This will prevent further wireless devices attempting to connect to it.

In a preferred embodiment, this process is embodied in an application stored in the access point (or other environment available to the terminal while offline) and downloaded to the, or each, terminal connected to the access point whilst the primary connection is detected as being unavailable.

In general public access points give users lower priority than their own dedicated access points. It is therefore also desirable that connection is re-established by way of the primary network as soon as it become available, in order to allow the user the prioritised use that his own access point provides, and also to make the capacity on the public access point available to other users. The present invention provides a process for automatically detecting the reconnection of the primary Internet connection link, and re-establishing connection between the terminal and the Internet by way of that link.

In the preferred arrangement, the access point continues to monitor for availablility of the primary connection, the terminal monitors the access point to identify when connection by way of the primary connection is restored, and restores its settings to effect such reconnection. The application may be arranged to defer such reconnection until any data session in progress has been completed.

It will be noted that although the data terminal must have a wireless capability, it is not necessary for the access point and data terminal to communicate with each other using that capability. The access point and data terminal may be connected by any suitable communication means, such as Ethernet, Powerline etc.

This invention allows users to maintain an active Internet connection during downtime of their main connection with minimal effort, and in particular can access troubleshooting websites to help get the customer reconnected. The invention does not require any pre-installation on the user device of any desktop help applications. In the preferred embodiment the user device downloads application software (e.g using Java), from the router itself, if it is still capable of communication with the user device in order to download the application. If the router is itself disabled, the application may be configured so that if a user device on which the application has previously been loaded detects loss of connection to the WLAN, it may attempt connection by an alternative access point.

BRIEF DESCRIPTION OF THE DRAWINGS

An embodiment of the invention will now be described with reference to the drawings in which

FIG. 5 is a typical readout from a network scan

DETAILED DESCRIPTION

Figure 1:
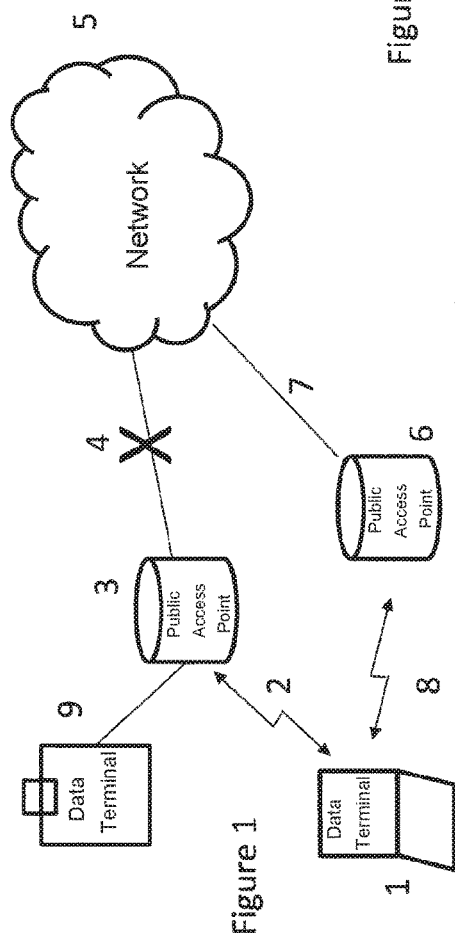
FIG. 1 illustrates a typical wireless LAN in which the invention may be implemented

FIG. 1 illustrates a data terminal 1 having a wireless access capability, by which it is connected using a Wireless LAN to a wireless router 3, which is in turn connected over a data connection 4 to a data network 5. The terminal 1 is configured to connect automatically to the router 3, using a private Wireless LAN. A second data terminal 9 is also connected to the router 3.

Also depicted in FIG. 1 is a second, public access point 6 having its own connection 7 to the data network 5. Conventionally, the terminal 1 would be able to detect the public access point 6 if it is in range, any such access points being identified to the user as being available for connection when first setting up the connection 2, or if the terminal 1 has been taken out of range of the previously selected access point 3. The user can thus cause the terminal 1 to set up an alternative wireless connection 8 with the public access point 6.

The present invention provides a process for over-riding the WLAN initial connection 2 and automating the process of establishing the alternative connection 8 in the event of failure of the data link 4 between the wireless router 3 and the network 5. Such failure cannot be detected directly by the terminal 1, as the WLAN 2 continues to operate.

The public network 8 can therefore be used as an alternative connection in the event of an outage in the user's own internet connection 4. In this embodiment the process is operated by firmware installed in the router 3, together with an application run on the terminal 1, which may be downloaded to the terminal 1 from the router 3.

Figure 2:
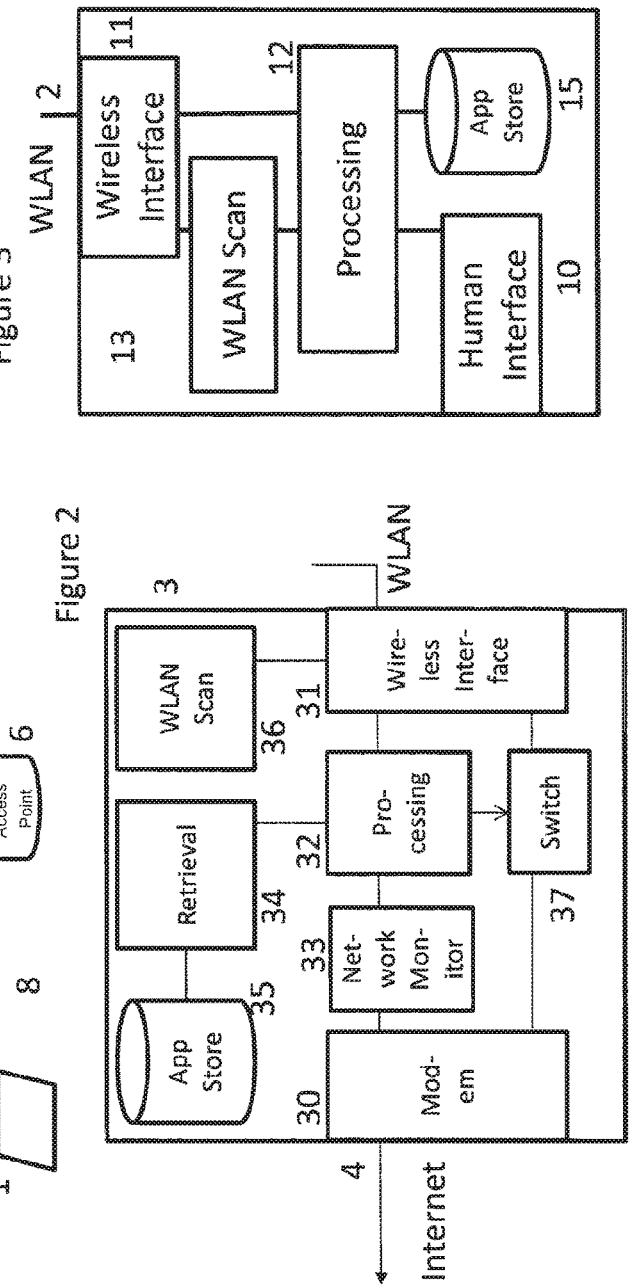
FIG. 2 illustrates the relevant functional elements of an access point in which the invention may be installed

FIG. 2 shows the relevant functional elements of the router 3 in more detail. The router comprises a modem/network interface 30 for connection to the internet 5 over a link 4, and a radio interface 31 for providing the wireless interface to one or more data terminals over the WLAN 2. A switching function 37 directs communication between the various inputs and outputs to the router 3, to and from terminals 1, 9, the external wireless router 6 and the primary connection 4. The condition of the link 4 is monitored by a monitoring system 33. Also provided is a store 35 for data processing applications, which may be retrieved using a retrieval processor 34 for download to terminals connected to the WLAN 2. The router is under the overall control of a processor 32.

The applications in the store 35 may be loaded in the router on manufacture or downloaded from a service provider over the Internet 5 and connection 4 in order to upgrade the operation of an existing router.

Figure 3:
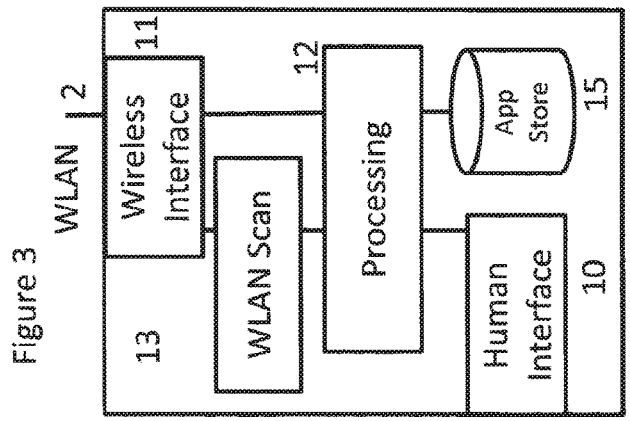
FIG. 3 illustrates the relevant functional elements of a wireless data terminal in which the invention may be installed

FIG. 3 shows the relevant functional elements of the data terminal 1 in more detail. These elements include a human interface 10, (screen, keypad, etc), a wireless interface 11 for connection to a WLAN, a WLAN scanning facility 13 for identifying available WLAN access networks, and an application store 15, all under the control of a processor 12.

Figure 4:
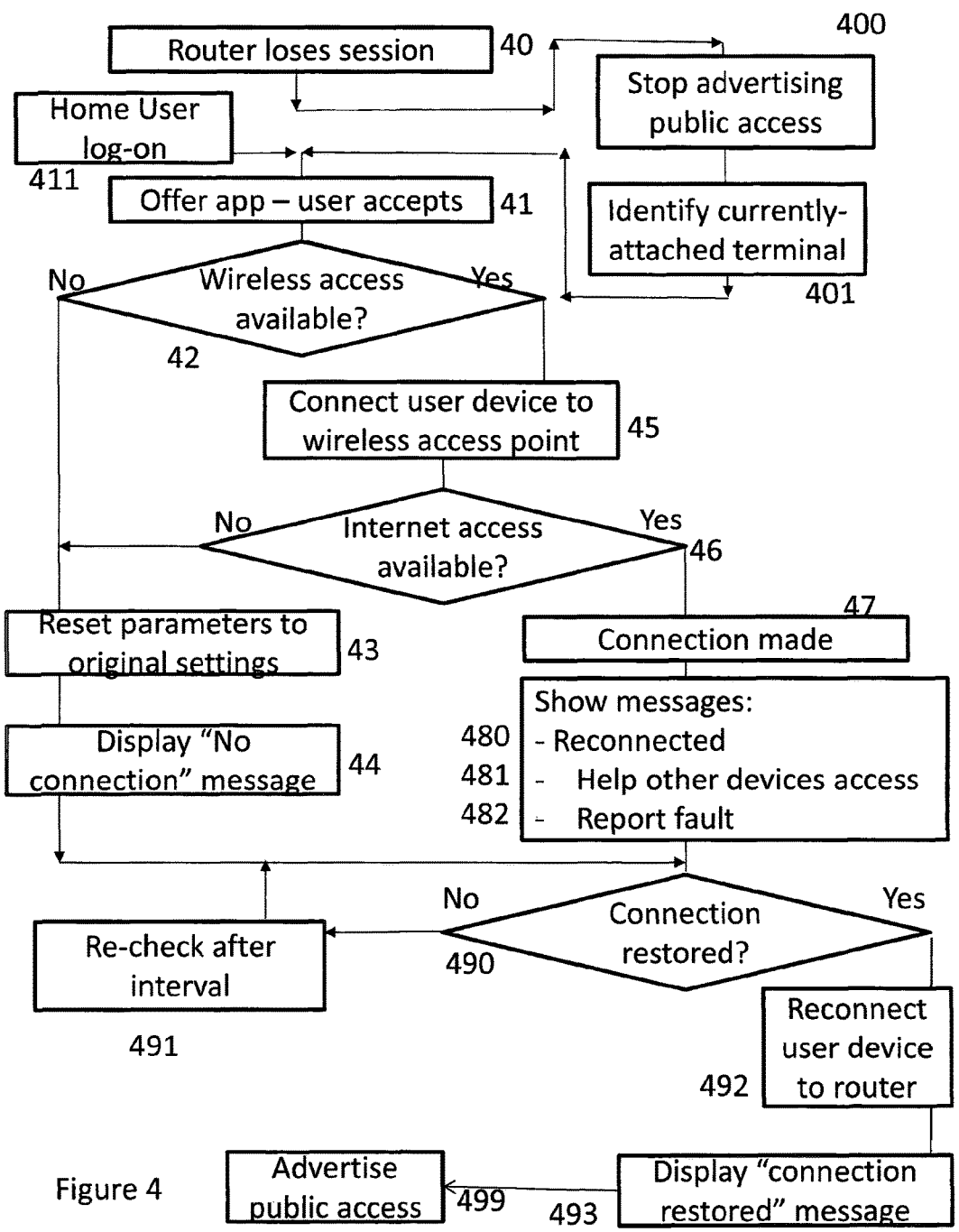
FIG. 4 is a flow diagram illustrating the process according to the invention.

The process operates as depicted in FIG. 4. The processes in the router 3 are controlled by the processor 32, calling on the application stored in the store 35.

Initially the router 3 is operating normally and running a point to point protocol (PPP) session over a connection 4 with the Internet, mediating a session between a terminal 1 and the internet 5. Although the invention uses a wireless capability for the backup connection 8, the initial connection 4 may be a fixed (wired) connection.

As shown in FIG. 4, the process is initiated when the router 3 detects a loss of connection (step 40). After a suitable delay to allow for any transitory faults, the processor 33 stops advertising its presence as a public access terminal (400), in order to prevent any terminals in the area attempting to establish a public-access connection through it.

The router 3 then identifies each terminal 1 with which it is already engaged in a session (step 401), and generates a signal 41 to indicate the loss of connection. Conventionally a message in this situation would simply convey a message indicating that the router is unable to connect to the internet and to try again later, or to consult the service provider's helpdesk. In the present invention the message 41 to the user is instead offered a download of the application stored in the router's application store 35 which will re-establish connection.

If more than one data terminal is connected to the router, they may each be offered the application. Further user terminals in the private network subsequently attempting to connect to the router (step 411) using their default settings whilst the fault is present may also be offered the application. As public access is not being advertised (step 400), terminals not having the access point as their default setting will not attempt to connect to it.

Alternatively, as discussed with reference to step 481 below, one user terminal may be selected and the user prompted to arrange connection for any other devices which require it. This arrangement reduces the likelihood of overloading the backup routing 6, 7, 8.

It should be noted that the user devices each attempt backup WLAN connection independently, so they may connect to different access points, depending on the relative signal strengths available to them. This can be an advantage, as it avoids overloading any one access point.

The signal 41 transmitted to the user terminal generates a prompt on the human interface 10 allowing the user to decide whether to download the application and attempt reconnection to the Internet by way of another access point 6. This gives the user the option of deciding to remain connected to the WLAN 2 and the router 3. He may wish to do this because he is conducting a session with another device 9 on the LAN (e.g. a printer) and this, rather than Internet connectivity, is currently the priority.

However, if the user confirms the download should proceed, the terminal transmits an acceptance to the router 3 which prompts retrieval of the application data from the store 35 and its delivery to the application store 15 in the terminal 1. If this is not the first time the process has been run, the application may already be present in the store 15, in which case it will be overwritten by the new download. This ensures that the latest version of the application is used.

The application, now installed in the terminal 1, controls the terminal to identify whether an alternative WLAN is available, and connect to it. The network scanner 13 scans for available WLANs (step 42). A typical readout will appear as FIG. 5. It is normal, but not always the case, that the user's own router has the strongest signal and appears first in the list. It should be noted that SSID 1 is the private-side WLAN of the user's own router, and SSID2 that of the public access-side of the same router. The router (3) should be configured such that SSID2 will be absent if the internet connection 4 has failed, although the router will still transmit its data for the WLAN (BSSID1).

As the router 3 is configured to cease transmitting its own SSID1, the scanner 13 will identify another SSID (e.g SSID3) relating to another access point 6, as providing the best signal, and attempt connection to that access point.

In an alternative arrangement the router continues to transmit its SSID, but the application is arranged for the scanner to disregard the SSID from the router from which the application was downloaded.

In the event that no alternative access point is available, for example because the user is in a remote location, the application resets its settings to their previous configuration (step 43) and displays a standard "no connection available" message on the user interface 10. (step 44)

The application now causes the terminal wireless interface 11 to establish a connection 8 to the selected wireless access point 6 (step 45), and having done so attempts to establish an Internet session 7 (step 46). If this fails, for example because a general fault has disabled connection 7 to all wireless routers in the area, the router resets its settings to their previous configuration (step 43) and displays a standard "no connection available" message on the user interface 10 (step 44).

If a connection is made available it is a further prompt (480) is sent to the user interface 10 to advise him that connection to the Internet has been re-established, together with any limitations such as capacity there may be on the new link 6, 7, 8. He may also be directed (481) to a website to advise on how to connect other devices 9 on his home network to the Internet over the link 6, 7, 8, or to report (482) on the failure of the primary link 4.

The WLAN scanner 13 periodically checks (490, 491) whether the router 3 has re-established connection 4 with the Internet 5. This may be done by attempting connection to ("pinging") one or more reliable websites using the WLAN link 2 via the router 3. Alternatively, the scanner 13 may check the readout from the wireless scan itself to determine if the SSID of the local router 3 is present.

If the internet connection 4 has been re-established, the user terminal generates a prompt 10 inviting the user to return to the original connection route 2, 3, 4. The user may choose to defer this if a session is currently in progress, but otherwise the application causes the device 1 to reconfigure itself so that the WLAN interface 11 reconnects to the router 3 (step 492) and notifies the user accordingly (step 493).

The router also resumes advertising its availability for public access (step 499).

In the event that a user device 1 which has previously been loaded with the application detects the loss of the WLAN connection 2, for example because of the failure of the router 3 itself, the user device may automatically carry out the steps of the process, beginning at the scanning step 42. However, it is preferred that, if the WLAN 2 is available but the internet connection 4 is not, the application is downloaded from the router 3 as this will benefit from any recent upgrades, and also allows the router 3 to control which user device or devices attempt an alternative connection in the event of congestion because of bandwidth limitations on the alternative routings.

What is claimed is:

1. A process for restoration of network access for a wireless-enabled data processing device, initially connected to a data network by means of a first access point, after connection between the first access point and the data network is lost, comprising the steps of:
   a. in the first access point, detecting loss of connection to the data network;
   b. transmitting instructions from the first access point to the data processing device to cause the data processing device to
      i. scan for beacon signals to identify operational wireless access points;

ii. identify a suitable redirection routing through a selected one of the further wireless access points; and
iii. establish connection to the data network through the selected further wireless access point;
wherein the instructions are retrieved by the data processing device from the first access point while connection between the first access point and the data network is lost;
wherein the first access point continues to monitor for availability of the connection between the first access point and the data network, the data processing device monitors the access point to identify when connection by way of the connection between the first access point and the data network is restored, and the data processing device restores its settings to effect such reconnection when such connection is achieved; and
wherein reconnection is deferred until any data session in progress has been completed.

2. A process according to claim 1, wherein the instructions are downloaded to the, or each, data processing device connected to the first access point whilst the connection between the first access point and the data network is detected to be unavailable.

3. A process according to claim 1, in which the downloaded instructions are configured so that if a user device on which the instructions have previously been loaded detects loss of connection to the access point, the user device attempts connection by an alternative access point.

4. A non-transitory computer-readable storage medium storing a suite of one or more computer programs operable in a wireless-enabled access point and arranged to implement a method by downloading instructions to one or more data processing devices, the method being for restoration of network access for a wireless-enabled data processing device, initially connected to a data network by means of a first access point, after connection between the first access point and the data network is lost, and the method comprising the steps of:
a. in the first access point, detecting loss of connection to the data network;
b. transmitting instructions from the first access point to the data processing device to cause the data processing device to
i. scan for beacon signals to identify operational wireless access points;
ii. identify a suitable redirection routing through a selected one of the further wireless access points; and
iii. establish connection to the data network through the selected further wireless access point;
wherein the instructions are retrieved by the data processing device from the first access point while connection between the first access point and the data network is lost;
wherein the first access point continues to monitor for availability of the connection between the first access point and the data network, the data processing device monitors the access point to identify when connection by way of the connection between the first access point and the data network is restored, and the data processing device restores its settings to effect such reconnection when such connection is achieved; and
wherein reconnection is deferred until any data session in progress has been completed.

5. A user terminal for connection to a data network through a wireless enabled access point, the user terminal comprising:
a processing system, including a computer hardware processor, the processing system being configured at least to:
perform monitoring for detecting loss of connection to the data network through a first access point, and
retrieve instructions from the first access point while connection between the first access point and the data network is lost; and
execute the retrieved instructions to at least:
(i) identify operational wireless-enabled access points using a scanning process, and
(ii) connect to the data network through an operational wireless-enabled access point identified by the scanning process in the event of loss a connection through the first access point;
wherein the processing system of the user terminal is further configured to monitor the first access point to identify when connection by way of the connection between the first access point and the data network is restored, and to restore its settings to effect such reconnection when such connection is achieved; and
wherein the processing system of the user terminal is further configured to defer such reconnection until any data session in progress has been completed.

6. A user terminal according to claim 5, wherein the processing system of the user terminal is further configured to scan for, during the scanning process, and connect to the operational wireless-enabled access point in response to the retrieved instructions downloaded from the first access point.

7. A user terminal according to claim 5, wherein the processing system of the user terminal is further configured to scan for and connect to the operational wireless-enabled access point in response to loss of connection to the first access point which is detected by the performed monitoring.

8. A user terminal to claim 5, in which the downloaded instructions are configured so that if a user terminal on which the instructions have previously been loaded detects loss of connection to the access point, the user terminal attempts connection by an alternative access point.

* * * * *